July 17, 1934.  V. E. CARBONARA  1,966,844
NAVIGATIONAL INSTRUMENT
Filed July 9, 1932  2 Sheets-Sheet 1
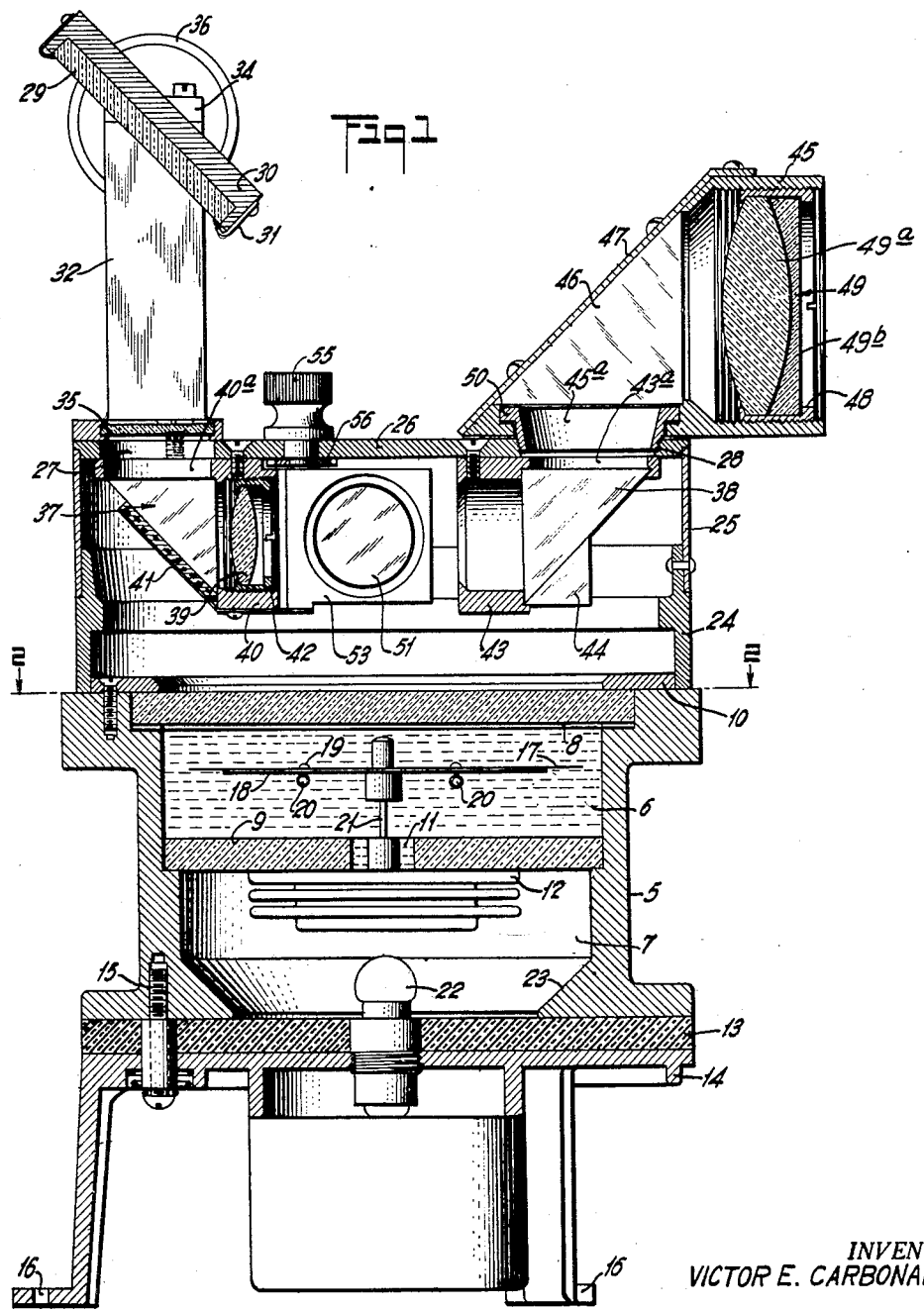
INVENTOR.
VICTOR E. CARBONARA.
BY Stephen Cerstvik
ATTORNEY.

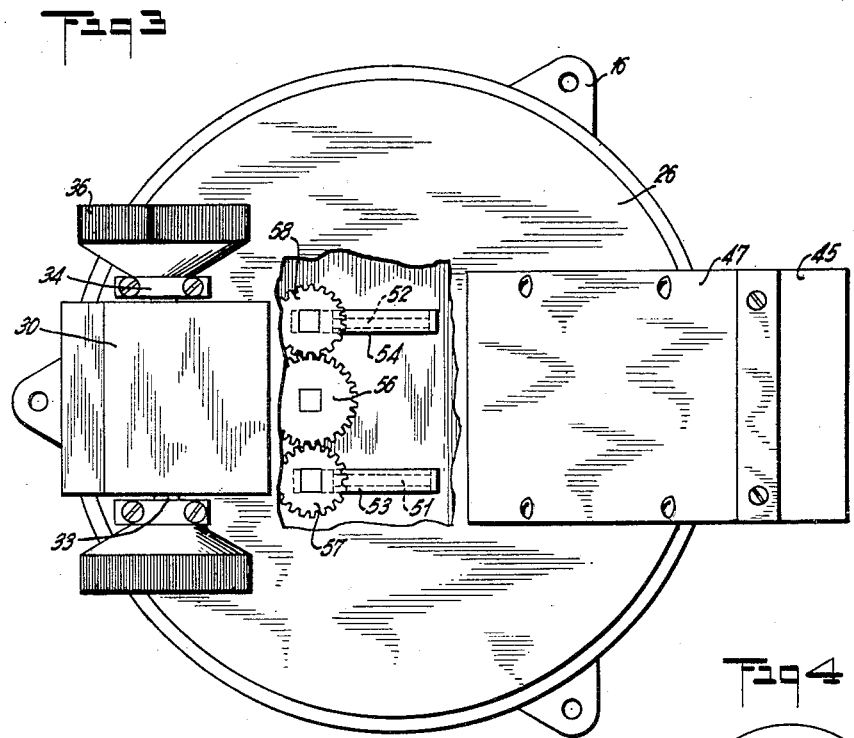
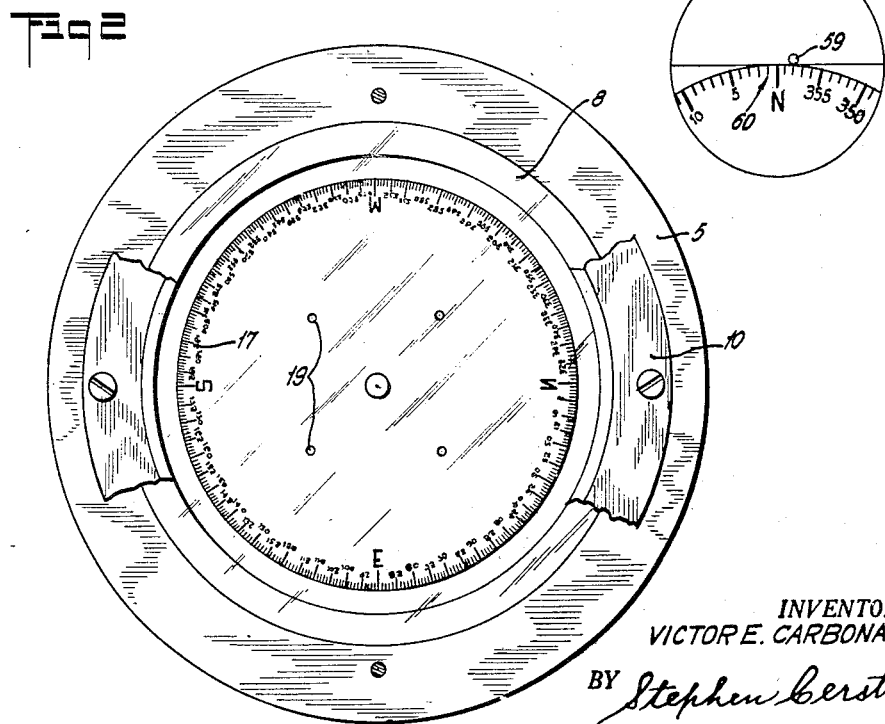

Patented July 17, 1934

1,966,844

UNITED STATES PATENT OFFICE 1,966,844

NAVIGATIONAL INSTRUMENT

Victor E. Carbonara, Rockville Center, N. Y., assignor to Bendix Aviation Corporation, South Bend, Ind., a corporation of Delaware Application July 9, 1932, Serial No. 621,708

5 Claims. (Cl. 88—2.7)

This invention relates to navigational instruments, and more particularly to an instrument for determining the azimuth or bearing of an object.

Means have been heretofore provided in combination with a compass for obtaining bearings of surrounding objects but such means have necessitated the keeping of the observed object in a defined line of sight, a difficult task when the observer is traveling at a high rate of speed such as, for example, in an airplane. Such means have also required the observer, when taking bearings of several widely separated objects, to move around the compass keeping the same at all times between himself and the object observed, thereby making it extremely difficult, for an observer in close quarters, to take bearings throughout 360 degrees. Another objection to the means heretofore provided is that it is difficult to conveniently take bearings of objects appearing on the ground below the horizon when the observer is at a high altitude.

One of the objects of the present invention is to provide novel means for readily and accurately taking bearings of objects.

Another object of the invention is to provide a novel azimuth compass wherein an enlarged field of view is substituted for the line of sight heretofore required.

Another object is to provide an instrument employing novel means for measuring azimuth whereby the observer is enabled to take bearings in all directions, as well as above and below the horizon, without shifting the position of his eye.

Another object is to provide a novel instrument which is so constructed that an observer may simultaneously view, in the same field, images of both the object of which it is desired to take a bearing and a portion of a compass card against which such bearing is to be measured.

Still another object is to provide novel direction indicating means in combination with an optical system whereby bearings of illuminated objects, such as celestial bodies, may be obtained at night.

A further object of the invention is to provide in an instrument of the class described and including a compass card, a novel optical system whereby the angular magnification of images of objects whose bearing is to be determined is equal to the angular magnification of the compass card.

A still further object is to provide a novel azimuth compass embodying an optical system for producing, in the same field of view, images of both the object of which it is desired to take a bearing and a portion of a compass card against which such bearing is to be measured, said optical system being so constructed and arranged that the angular magnification of the images of the object and of the compass card are substantially equal, whereby the position of the image of the object against the image of the card along the periphery of the latter, gives a direct and accurate reading of the bearing.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference being primarily had for this purpose to the appended claims.

In the drawings wherein like reference characters refer to like parts throughout the several views:

Fig. 1 is a side elevation view, partly in section, of an instrument embodying the present invention;

Fig. 2 is a top plan view, with parts broken away, of a compass employed in carrying out the invention;

Fig. 3 is a top plan view of the invention shown in Fig. 1 with a portion of the cover plate broken away; and Fig. 4 is a detail view showing an example of the observer's field of view.

Referring now to the drawings, and more particularly to Fig. 1, one embodiment of the present invention has been illustrated as employing a magnetic compass constituted by a bowl 5 which is divided into upper and lower compartments 6 and 7, respectively. Compartment 6 is hermetically sealed at top and bottom by means of a pair of transparent, preferably glass, plates 8 and 9. Top plate 8 is held in place by a ring 10 which engages the outer edge of the same and is secured by means of screws to the top of bowl 5. Bottom plate 9 rests on a shoulder near the midportion of bowl 5 and is provided near its center with a plurality of small openings 11 by means of which compartment 6 communicates with an expansible diaphragm chamber 12. The latter is suitably attached to the central portion of the lower face of plate 9 and permits expansion or contraction of a damping liquid with which compartment 6 is filled. With a resilient disc 13 between the two, bowl 5 is secured to a three-legged stand 14 by means of screws 15, only one of which is shown. The instrument may be secured to a suitable base (not shown) by means of feet 16 on the legs of stand 14.

It is desirable that an instrument of this class be adapted for both day and night use and, with this object in view, novel direction indicating means are provided. As illustrated, such means consist of an indicating dial on compass card 17 centrally positioned within compartment 6 and secured by means of rivets 19 to the upper surface of a circular plate 18. The latter is pivotally mounted at its center on a pivot post 21 which is in turn supported by plate 9. Card 17 is of greater diameter than plate 18 so that the circumferential edge thereof extends beyond the periphery of said plate and is made of some suitable material whereby the graduations thereon may be made transparent so that light may readily pass therethrough. There are preferably four rivets 19 equally spaced about the center of card 17 and having eyelets formed in the lower ends thereof for supporting a pair of compass needles or bar magnets 20 parallel to the northsouth line of said card. Bars 20 will then tend to hold the latter in a fixed position relative to the earth's magnetic poles. For a purpose which will appear more fully hereinafter, the graduation figures on card 17, as viewed from above, are inverted and bars 19 are mounted so as to maintain the zero degree marking of said card to the south instead of to the north as is the practice in ordinary compasses.

Illumination means are provided for rendering it possible to transmit, through reflecting prisms or mirrors, a clear and distinct image of the graduations on card 17. Such means, as shown, comprise an electric light 22 threadedly mounted in the top of stand 14 and extending upwardly through disc 13 into the center of compartment 7. For the purpose of directing the rays from light 22 to the edge of card 17, the lower, inner wall of bowl 5 is inclined inwardly forming a reflecting surface 23. Light rays are thereby reflected vertically upward through the graduation marks on card 17.

Novel means are provided in combination with the above-described compass for forming an image of a distant object (generally considered in optics to be at infinity) together with one of a portion of the compass card in the same field of view where the two may be simultaneously and adjacently observed. As shown, such means are constituted by a novel alidade consisting of a system of mirrors, prisms and lenses mounted in a suitable housing comprising a cylinder 24, the lower inner diameter of which is substantially equal to the peripheral diameter of ring 10 about which it is adapted to fit and be rotated. A light cylinder 25 is riveted to the upper edge of base cylinder 24 and is provided with a cover plate 26 which has a pair of diametrically disposed circular openings 27 and 28 cut near the circumference thereof. It will be noted that the complete alidade unit may be rotated about a vertical axis passing through the center of compass card 17. The novel alidade is so constructed and arranged, as will be pointed out more fully hereinafter, that the angular magnification of the image of the object is substantially equal to the angular magnification of the image of the portion of the compass card which is viewed when taking a bearing of said object.

For the purpose of directing an image of an object into the instrument irrespective of the depression or elevation of said object with respect to the observer, and for the purpose of availing the observer of a comparatively large field of view, there is provided a reflector which is adapted to be swung about a horizontal axis. In the form shown, a mirror 29 is held in a recess in a member 30 by a ring 31 attached by means of set screws to said member and having an inwardly extending flange which engages the face of mirror 29.

The above-described mirror assembly is rotatably supported in journals, formed on top of vertically-extending arms of a U-shaped bracket 32, by means of a pair of axles 33 (Fig. 3) extending laterally from member 30 and rotatably maintained on the arms of said bracket by bearing covers 34. Bracket 32 is fixed to cover 26 by suitable screws in a position such that a glass covered opening 35 in the lower central portion of the bracket registers with opening 27. Preferably, the axis of rotation of mirror 29 is in the same vertical plane with the center of opening 27 and parallel to a line which is perpendicular to a radius drawn from the center of cover 26 through the center of said opening. A pair of knobs 36 are secured to the outer ends of axles 33 for turning mirror 29 to the desired position, the latter being held in adjusted position by suitable friction means, if desired.

Optical means are provided for transmitting the image reflected by mirror 29 to the same field of a view as the graduations on compass card 17 and, in the form illustrated, such means comprise a pair of diametrically disposed reflecting prisms 37 and 38 mounted beneath openings 27 and 28, respectively, and an objective lens 39 interposed between said prisms. In order to obtain equal angular magnification of the images of the object and of the compass card, the focal length of the objective lens 39 is made substantially equal to the radius of the compass card 17. Thus the angular magnification of the images formed by the objective lens is equal to the angular values of the compass card when observed in the same field of view, i. e., an angle of one degree extending horizontally from the center of lens 39 into the field in which the object to be viewed is located is made equal to one degree on the compass card so that when the images of the object and the card are brought together in the image plane of a field lens to be described hereinafter, correct and accurate readings of the bearing of the object are obtained from the card image without having to correlate the two images to a reference mark or hair line. In other words, if the object moves angularly one degree in the field in which it is, its image will move one degree on the image of the card. Obviously and irrespective of the novel arrangement for producing equal angular magnification, the optical distance from the image plane of the lens 39 to the field lens must be equal to the optical distance from the compass card to the field lens in order to produce the images of the object and card in the same image plane. Prism 37 is mounted in the corner of a member 40 in a manner such that light rays entering it from mirror 29 will be reflected at right angles toward a vertical axis passing through the center of compass card 17, and is supported by means of an angle plate 41 secured to member 40 and engaging the diagonal face of said prism. The horizontal portion of member 40 is provided with an opening 40a which registers with opening 27 while the vertical portion of said member has a threaded opening therein for receiving a lens holder 42 which carries objective lens 39. Prism 38 is supported in a member 43, similar to member 40, by means of grooves into which the corners of said prism are adapted to slide, said member 43 having an opening 43a in the horizontal portion thereof which coincides with the opening 28 and an opening in its vertical portion through which rays from lens 39 may enter prism 38 which directs them vertically upward through opening 28.

The light rays from the graduations on card 17, the edge of which lies directly under the left hand portion of prism 38 as viewed in Fig. 1, are caused to continue vertically upward also through prism 38 and opening 28. For this purpose, a small right angle prism 44 is provided having its diagonal face cemented to the lower half of the diagonal face of prism 38. Light rays from both the object and compass card are thereby brought into the same field of view through opening 28.

Due to the fact that an observer is often in cramped quarters, such as in an airplane, it is desirable to provide means whereby the images developed by the above-described optical system may be viewed from any desired point about the instrument irrespective of the azimuth of the object observed. Such means, as herein shown, consist of housing member 45, one portion of which is triangular in shape for receiving a right angle reflecting prism 46 adapted to reflect vertical rays into a horizontal plane. A suitable plate 47 secured to member 45 by means of screws is provided for holding prism 46 in place.

The portion of member 45 adjacent the vertical face of prism 46 is provided with an opening into which a lens holder 48 is threaded, the latter having a field lens 49 mounted therein for focusing the rays reflected by prism 46, the field lens consisting of a double concave lens 49a and a plano-convex lens 49b cemented together. The base of housing 45 is provided with an opening 45a directly below prism 46 and the entire unit is rotatably mounted on cover 26 by means of a hollow flanged nut 50 which extends downwardly through said opening and is held in place by the threaded wall of opening 28. Member 45 may thereby be rotated about a vertical axis passing through the center of opening 28 and may be turned to suit the position of the observer's eye irrespective of the azimuth of the observed object. The optical system is also so designed that the exit pupil thereof is about one foot away from the field lens 49 so that the observer need not be compelled to bring his eye close up to said field lens but may easily note the reading from a distance of one foot therefrom.

It is nearly always necessary when observing the sun to use some means for eliminating the glare or blinding effect of the sun's rays. Suitable colored glasses 51 and 52 (Figs. 1 and 3) are provided for this purpose and, as shown, these glasses are secured in frames 53 and 54, respectively, either of which is adapted to be swung into the path of the light rays as the same emerge from lens 39. The axes about which frames 53 and 54 are adapted to be swung are near one edge thereof and are interposed between cover 26 and an extension on plate 41. For swinging said frames about their axes, there is provided a knob 55 projecting from cover 26 and having a spur gear 56 operatively attached thereto. The latter engages spur gears 57 and 58 which are diametrically disposed relative to gear 56 and are secured to the axes of frames 53 and 54, respectively. When knob 55 is turned clockwise, then, glass 51 will swing in front of lens 39 whereas a counter-clockwise rotation will swing glass 52 before lens 39.

When it is desired to measure the azimuth or take the bearing of an object, it is only necessary to turn the entire alidade unit about its vertical axis until the optical axis of the system points toward the observed object, that is, until the axis 33 of reflector 29 is substantially perpendicular to light rays entering the same from said object and to adjust member 45 to suit the position of the eye. Reflector 29 is then turned about its horizontal axis by means of knobs 36 until an image of the object is reflected vertically downward through opening 35, 27 into prism 37. The light rays striking the back of prism 37 are turned through 90 degrees and directed through lens 39 to prism 38 which turns the same through 90 degrees, reflecting the rays vertically upward. At the same time, light rays from lamp 22 are reflected by surface 23 upwardly through the transparent graduations on card 17 and prisms 44 and 38, no rays from lamp 22 being allowed to illuminate the portion of the field in which the object image appears. Images of the observed object and the compass card graduations being thus brought into the same field of view, the rays of each enter prism 46 which turns the same through 90 degrees. Both images are thereby magnified to such an extent that the angular magnification of the image of the object whose bearing is being determined is equal to the angular values of the compass card when viewed in the field lens 49 and are then reflected through said field lens to the eye of the observer who may be one foot away from the instrument. Reflector 29 may be adjusted until the image 59 (Fig. 4) of the object as seen through lens 49 is immediately adjacent image 60 of compass card 17. The inverted numerals on the latter are converted by prism 46, and a readable image is transmitted to the eye, the graduations appearing to progress in a counter-clockwise direction rather than clockwise as is customary. Since compass card 17 is turned through 180 degrees from its normal position, as pointed out above, the correct azimuth reading is, as shown, obtained from a point on said card directly opposite the direction of the object observed. Such novel arrangement permits accurate observation of magnetic azimuth angles without reference to any other fiducial than the compass card itself. In other words, as long as the object appears somewhere in the field of view of the instrument, its magnetic azimuth can be taken by operating reflector 29 so as to bring the image of the object in close proximity to the virtual image of the compass card 17 which is simultaneously visible in the field lens 49.

There is thus provided a novel compass and azimuth alidade which enables an observer to readily and accurately obtain the azimuth of a body which is located either above or below the horizon and one which enables the observer to take bearings in any direction without shifting the position of his eye. Thus, an observer in cramped quarters such as in an airplane, may take any bearings with perfect ease. A novel combination of elements is also provided whereby an image of the object, the azimuth of which it is desired to measure, is brought into close proximity with a virtual image of a suitable graduated scale such as a compass card against which the azimuth measurement is made, making said images simultaneously visible in a common field of view, and making the angular magnification of said images substantially equal so that the image of the object against the image of the compass card gives a direct and correct reading of the bearing of the object. Novel means are also provided whereby in taking a bearing it is necessary only to keep the observed object in a comparatively large field of view instead of in a defined line of sight.

Although only one form of the invention has been shown and described, it is to be expressly understood that the same is not limited thereto, but that various changes may be made in the mechanical forms. For example, any type of compass may be employed in lieu of the magnetic compass illustrated, and the term "movable compass card" as employed in the claims is of sufficient scope to cover a scale graduated in degrees, such as a pelorus scale. Various other changes may also be made in the designs and arrangements of parts shown without departing from the spirit of the invention. For a definition of the limits of the invention, reference will be primarily had to the appended claims.

What is claimed is:

1. In an instrument wherein a compass having a movable compass card is employed for measuring the azimuth of objects, the combination with said compass, of an optical system mounted for rotation about a vertical axis passing through the center of said card and comprising a mirror adapted to be swung about a horizontal axis, a pair of reflecting prisms for directing reflected rays from said mirror parallel and adjacent to light rays emanating from said compass card, an object lens between said prisms, a field lens, and a rotatable prism for reflecting said light rays in any horizontal direction through said field lens, said object lens having a focal length equal to the radius of the compass card whereby equal angular magnification of the two images is obtained.

2. In apparatus of the class described, a graduated movable compass card, illuminating means for said card, means for reflecting an image of a portion of said card along a line of sight parallel to the plane of said card, a rotatable reflector for reflecting an image of a distant object, a telescope objective having a focal length equal to the radius of the compass card and positioned in the path of the reflected image and above said card in a plane perpendicular to the plane of the card for reproducing said object image, and means for transmitting said last-named image to a common field of view with said card image.

3. The combination with a compass having a movable compass card of an optical system adapted to be rotated about a vertical axis passing through the center of said card, a portion of said system being also adapted to be rotated about an axis parallel to said first-named axis, said latter portion being adapted to receive an image of said card, a reflector adapted to be moved about a horizontal axis for reflecting an image of a distant object into said system, a telescope objective having a focal length equal to the radius of the compass card and positioned in the path of the reflected image and above said card in a plane perpendicular to the plane of the card for reproducing said object image, and means in said system for reflecting said images into a common field of view.

4. An instrument for taking bearings of objects, comprising a compass having a movable card for indicating direction, transparent graduations on said card, means for projecting light rays upwardly through said graduations, means for reflecting an image of a remote object into said instrument, a telescope objective having a focal length equal to the radius of the compass card and positioned in the path of the reflected image and above said card in a plane perpendicular to the plane of the card for reproducing said object image, means for reflecting the reproduced image parallel and adjacent to said light rays whereby the object image and an image of a portion of the compass card are reproduced adjacent each other, and means for viewing said images.

5. An instrument for taking bearings of objects, comprising a compass having a movable card for indicating direction, transparent graduations on said card, means for projecting light rays upwardly through said graduations, means for reflecting an image of a remote object into said instrument, a telescope objective having a focal length equal to the radius of the compass card and positioned in the path of the reflected image and above said card in a plane perpendicular to the plane of the card for reproducing said object image, means for reflecting the reproduced image parallel and adjacent to said light rays whereby the object image and an image of a portion of the compass card are reproduced adjacent each other, and means for reflecting said images in any horizontal direction.

VICTOR E. CARBONARA.